Figure 1:
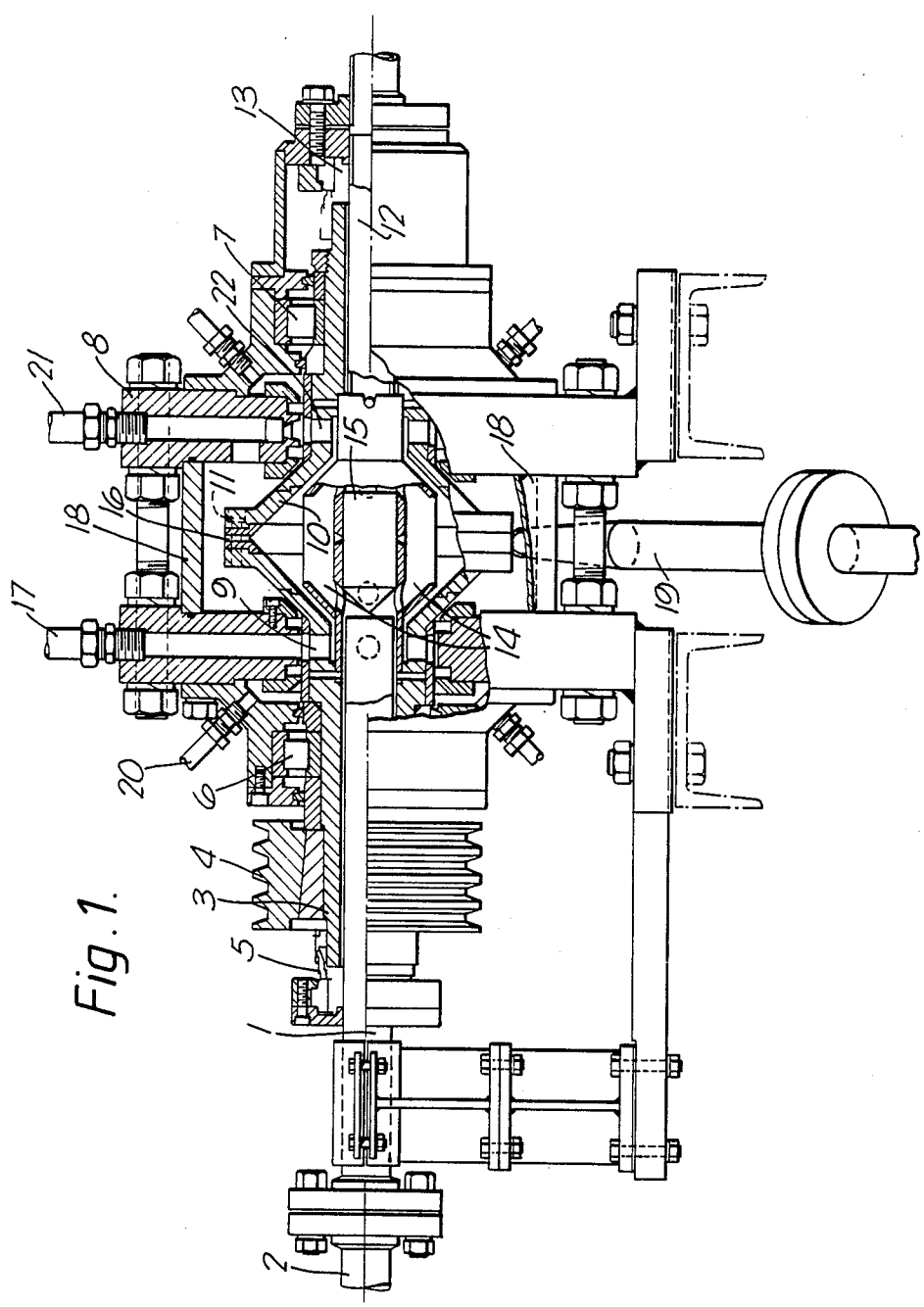

United States Patent [19]

Wem et al.

[11] Patent Number: 4,830,751
[45] Date of Patent: May 16, 1989

[54] PROCESS OF REPLACING A LIQUID COMPONENT OF A SLURRY BY A SECOND LIQUID AND APPARATUS THEREFOR

[75] Inventors: James W. Wem; William Parten, both of Cleveland, England

[73] Assignee: Imperial Chemical Industries PLC, London, England

[21] Appl. No.: 36,769

[22] Filed: Apr. 9, 1987

[30] Foreign Application Priority Data

Apr. 9, 1986 [GB] United Kingdom ................ 8608655
Aug. 12, 1986 [GB] United Kingdom ................ 8619585

[51] Int. Cl.$^4$ ............................................. B01D 11/02
[52] U.S. Cl. ...................................... 210/634; 210/511
[58] Field of Search ................ 422/258; 210/634, 511, 210/321.68

[56] References Cited

U.S. PATENT DOCUMENTS

| | | | |
|---|---|---|---|
| 3,148,139 | 9/1964 | Heller | 422/258 X |
| 3,661,774 | 5/1972 | Masologites | 210/21 |

FOREIGN PATENT DOCUMENTS

| | | |
|---|---|---|
| 0024097 | 2/1981 | European Pat. Off. |
| 2258713 | 6/1973 | Fed. Rep. of Germany |
| 2930312 | 2/1981 | Fed. Rep. of Germany |
| 129566 | 11/1960 | U.S.S.R. |

OTHER PUBLICATIONS

"The Merco Centrifuge", Dorr-Oliver Bulletin 2614, 1987, 24 pages.
"Chemical Engineers' Handbook", 6th Ed. Perry & Green, 1984, pp. 19-89 to 19-103.

Primary Examiner—Frank Spear
Attorney, Agent, or Firm—Cushman, Darby & Cushman

[57] ABSTRACT

The solid component of a slurry comprising a first liquid is driven into a second liquid by an enhanced gravitational field by rotating the slurry in contact with a zone comprising the second liquid. The liquids may be miscible. The product is a slurry of the solid in the second liquid.

9 Claims, 3 Drawing Sheets

PROCESS OF REPLACING A LIQUID COMPONENT OF A SLURRY BY A SECOND LIQUID AND APPARATUS THEREFOR

This invention relates to a process of replacing a liquid component of a slurry by a second liquid and apparatus therefor.

It is sometimes found necessary, for example in the chemical industry, to replace a liquid component of a slurry (the first liquid) by a second liquid, for example if a solid has been produced as a slurry in one liquid and is to be used or further processed as a slurry in another. This is conventionally done by separating the solid from the first liquid, for example by centrifuging or filtering, and reslurrying it. This invention provides a process in which these stages may be carried out simultaneously provided that the solid component of the slurry has a higher density than both liquids or provided that the second liquid has a density between that of the solid and the first liquid.

The invention comprises driving the solid component of a slurry comprising a first liquid and the solid, the solid preferably comprising 10% to 50% and more preferably 20% to 40% by volume of the said slurry into a second liquid which is miscible with the first liquid and in which the density of the solid is greater than that of both liquids or in which the second liquid is of density intermediate between that of the solid and the first liquid by an enhanced gravitational field by rotating the slurry in contact with a zone comprising the second liquid. Preferably the second liquid is rotated at a similar angular velocity and preferably the same angular velocity to that of the slurry.

Wasing centifuges are known in which a bed of solids is formed and in which the bed or solids from the bed are washed. However, the passage of solids from a slurry directly into the second liquid gives a more thorough washing effect than if a bed of solids is formed.

A barrier which is permeable to the solids may be provided to separate the zone comprising the second liquid from the slurry but it is usually possible to operate at rates of flow of the slurry and second liquid sufficient to maintain an adequate difference of liquid composition between the said zone and the slurry without a barrier. There may be a marked concentration gradient of the two liquids between the said zone and the slurry, which may in extreme cases amount almost to a separation of the two liquids, but it is only necessary that the concentration gradient be sufficient to ensure the appropriate degree of liquid replacement at the point of discharge of the treated slurry.

The invention also comprises rotating the said slurry comprising a first liquid and a solid in contact with one side of a rotating barrier which is permeable to solids of the slurry, contacting the other side of the said barrier with a second liquid of density intermediate between that of the solid and the first liquid and thereby driving the solids through the barrier by centrifugal forces. The liquids may be miscible or immiscible in this case.

The barrier may comprise an impeller assembly with radial vanes in which the solids pass through a region of low turbulence.

There is normally a region of higher radial concentration gradient of the liquid inside and/or outside the impeller assembly and higher turbulence normally occurs outside it because if a body of liquid outside the impeller is relatively slow moving the rotary motion of the impeller will tend to create turbulence in the contiguous areas of such liquid.

Alternatively, the barrier may comprise for example a permeable porous barrier for example the porous metallic material sold under the trade mark "Retimet".

The barrier can be regarded as separating the primary paths of flow of the two liquids in a continuous process.

Preferably the rates of flow of liquid through the barrier are adjusted to ensure that the greater part of the liquid composition change occurs within or near the barrier. When this occurs within the barrier the least mixing of the liquids occurs. If it is wished to depart from this condition so as to increase further the purity of either of the first liquid withdrawn or the slurry it may be achieved as follows.

If leeakage of the first liquid into the second slurry is to be allowed then the slurry inlet flow is increased from the flows at which least mixing occurs. If leakage of second liquid into the recovered first liquid is to be allowed then the first slurry input is decreased from flows at which least mixing occurs.

The zone comprising the second liquid is a central zone or an outer zone judged from the axis of rotation according to whether the solid is less or more dense than the first liquid respectively.

The invention also provides apparatus which comprises two zones separated by a rotary barrier which is permeable to solids of a slurry one zone being within the barrier and the other outside the barrier, means for feeding a slurry comprising a liquid and a solid to one of the zones which is adapted to rotate the slurry and for withdrawing liquid from the said zone, the other zone comprising means for feeding a second liquid of density intermediate between that of the solid and the first liquid and for withdrawing slurry.

In a further form of the invention the process comprises, (a) feeding a slurry comprising a first liquid and a solid component of higher density than the first liquid into a zone within a rotating barrier which is permeable to solids of the slurry.

(b) rotating the slurry within the said barrier, (c) feeding a second liquid which is of greater density than the first, and which is of density less than the solid of a zone in which it rotates at substantially the same angular velocity as the slurry and contacts an outer surface of the said barrier and driving the solids through the barrier from the first to the second zone by centrifugal forces.

A further form of apparatus according to the invention comprises a rotor having inner and outer chambers, the inner chamber being adapted to receive a slurry at one end and to accelerate it radially to a liquid withdrawal zone, the inner chamber having an opening to the outer chamber at a substantial radial distance beyond the liquid withdrawal zone, the outer chamber being adapted to lead a second liquid preferably at a similar angular velocity to the rotor to the said opening and to discharge a slurry comprising solids passing through the opening and the second liquid through a narrow aperture or apertures at a greater radius than the said opening.

The narrow aperture or apertures must be such as to provide a back pressure sufficient to ensure that the chambers are substantially filled with liquid and slurry. The discharged slurry is collected for example as a tangental stream from the aperture or apertures.

In this form of the invention the flow of the slurry and second liquid is adjusted so as to locate the main concentration gradient between the first and second liquid in the space between the liquid withdrawal zone and the said opening, which may, if desired, contain a porous barrier, for example of porous metal such as is sold under the trade name "Retimet".

The difference in density of the solid and the first liquid is preferably at least 10% and the second liquid is preferably at least 1% and more preferably at least 2% different in density from both. The liquids are preferably immiscible but the process is remarkably effective even with miscible liquids. The process may be applied for example in replacing the acetic acid in slurries of terephthalic acid in acetic acid by water. The process of this invention may be carried out without excessive mixing of the liquids.

If the density of the solid is greater than that of both liquids but the density of the second liquid is less than that of the first mixing of the liquids is more marked than if it is greater than the first. It may still be possible however if the design of apparatus and the conditions of operation are carefully chosen to secure acceptable results.

The first and second liquids may differ in composition, chemical nature or temperature. In the latter case thermodynamic benefit may be obtained for example by replacing a hot liquid of a slurry comprising a solid heavier than the liquid by colder liquid; a colder slurry is thus obtained without having to cool the liquid. A particular benefit obtains when it is desired to reslurry such a solid in a colder liquid of different composition, for example, a purer liquid, since purification as well as thermodynamic benefits are obtained.

The invention will now be described with reference to the drawings, of which FIG. 1 shows apparatus according to the invention, the upper part being shown in section and the lower part in outline.

Tube 1 is a stationary tube of which the outer end constitutes a feed inlet 2. Rotary shaft 3 surrounds tube 1 for part of its length and tube 12 for another part of its length and is driven by pulley assembly 4; seals 5 and 13 prevent escape of fluid from the annular gap between tube 1 and tube 12 respectively and shaft 3. Bearings 6 and 7 permit rotation of shaft 3 and support it within housing 8.

Shaft 3 comprises radially disposed slots 9 through its wall and around its whole circumference and is enlarged to form a wall 10. For convenience in maintenance, the shaft 3 is formed of two portions joined together by bolts 11. A stationary outlet tube 12 is provided for the first liquid.

Within wall 10 and secured to shaft 3 by splines is located an assembly of vanes 14 which project radially from a central spacer 15. Discharge nozzles 16 are provided around the circumference of wall 10.

Inlets 17 and 21 for the second liquid are provided in housing 8 and communicate with slots 9 and 22 and thus to the interior of wall 10. The housing comprises a cylindrical drum 18 surrounding the wall 10 from the bottom of which a slurry discharge pipe 19 leads.

The casing is arranged to be self draining through pipe 19.

The apparatus is operated as follows.

Slurry comprising solids and a first liquid for example terephthalic acid in acetic acid at a temperature of 200° C. is fed through feed inlet 2 and the second liquid (for example if the slurry is of terephthalic acid in acetic and, the second liquid may be water preferably at a lower temperature to increase its density) is fed through inlets 17 and 21. Shaft 3 is rotated by means of pulley assembly 4, the spacer 15 and vanes 14 rotating with it.

As slurry emerges from tube 1 it is deflected by spacer 15 and rotated by vanes 14, thus driving the solid particles into the second liquid which passes into the outer side of wall 10. A sufficient back pressure may be secured by restricting the size of nozzles 16 and operating with the drum 18 only partly full.

A slurry of solid in the second liquid is expelled through the nozzles and falls to the bottom of the drum 18 from which it is drained through pipe 19. The first liquid, usually together with some of the second liquid if it is miscible, is withdrawn through tube 12.

Figure 2:
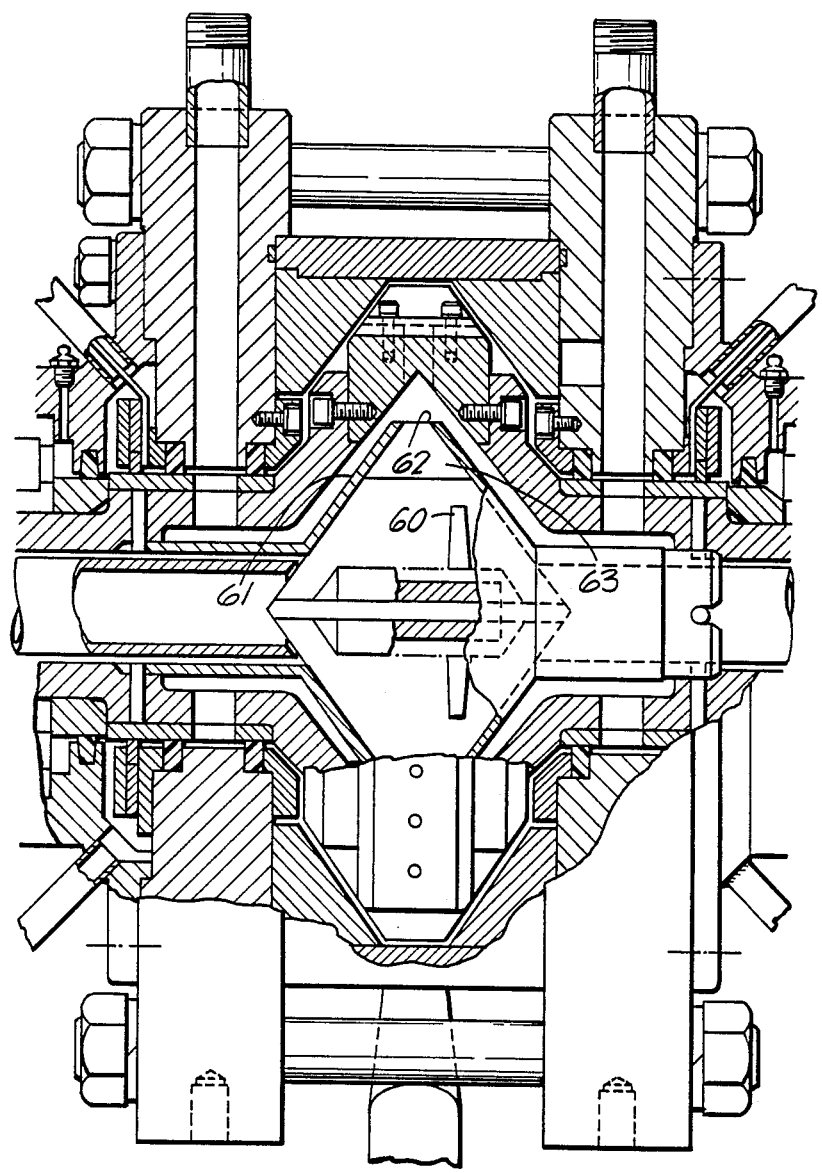

A modification of the apparatus of FIG. 1 is shown in FIG. 2 which shows a cross section through the axis of an alternative construction of the central part of shaft 3 in which the vanes 14 are extended and in which a deflector baffle 60 is included to ensure that slurry flowing through the apparatus is forced outwards. The housing of the vane 61 is also extended to produce a narrower opening 62 for solids to pass into the second liquid and a long chamfer is applied to the vanes at 63 to reduce their thickness at their tips and thus to reduce turbulence.

Figure 3:
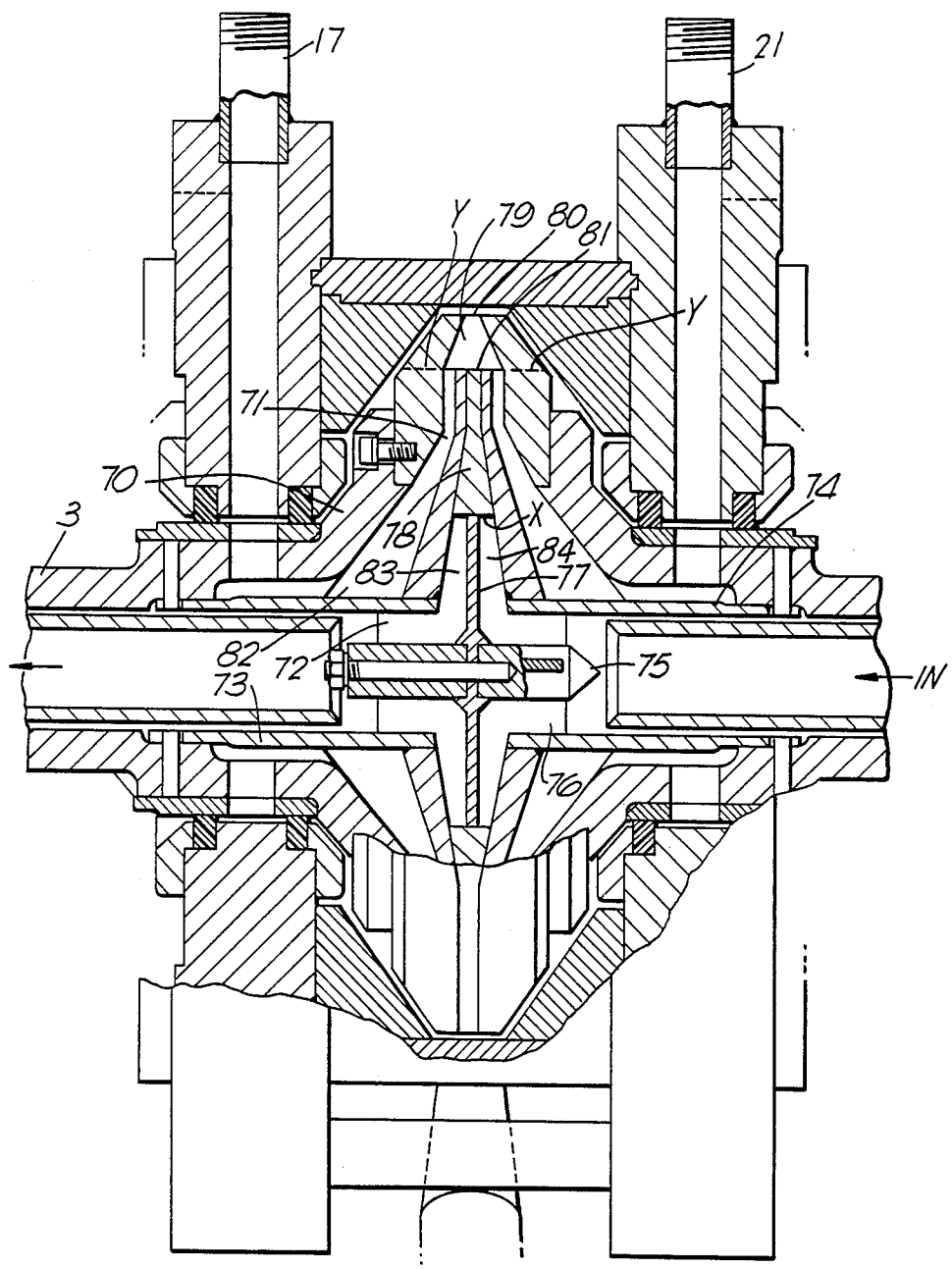

A further modification of the apparatus of FIG. 1 is shown in FIG. 3 which shows a cross section through the axis of an alternative construction of the central part of shaft 3 in which wall 70 defines an outer chamber 71 surrounding an inner chamber 72. The inner chamber is defined by two dished ended tubes 73 and 74 of which the dished ends face one another and the tubular ends are engaged with shaft 3. Within the inner chamber 72 lies a central spacer 75 bearing vanes 76 dividing the inner chamber into sectors and a disc 77 perpendicular to and concentric with the axis of shaft 3 and central to the vanes. Disc 77 divides the inner chamber 72 into slurry introduction zone 84 and liquid withdrawal zone 83. Porous metal packing 78 may also be present and is shown.

The ends of the facing dishes defining opening 81 are received into an annular recess 79 leading to a narrow peripheral opening 80. In an alternative but less effective construction the walls 70 of the outer chamber terminate at the dotted line Y.

The outer chamber communicates with inlets 17 & 21 and contains radial vanes 82 dividing the chamber into sectors. Vanes 82 are optional but preferred, if a positive pressure is applied to the outer casing 18 and chamber 71 they may be omitted.

The apparatus operates as follows. A slurry for example of terephthalic acid in acetic acid is introduced into the inner chamber on the right hand side whilst shaft 3 is rotated. Liquid is withdrawn from the left hand side of the chamber. The slurry is rotated by vanes 72 and deflected by disc 77 to the position shown as X. The rate of rotation of shaft 3 is adjusted so that the gravitational forces at the point X produce a settling velocity of the slurry greater than the inward flow rate of liquid of the slurry on the left hand side of disc 77. Thus, the solids of the slurry migrate outwardly whilst liquid largely passes past the disc 77 and is withdrawn from the left hand side of the inner chamber.

The solid migrates through packing 78 (if present) and through opening 81.

A second liquid, for example water, is introduced to the outer chamber 71 through inlets 17 & 21, is rotated by vanes 82 and passes to recess 79. The relative pressures of the second liquid and the slurry are preferably maintained such that a slight flow of the second liquid into the inner chamber occurs. Solids emerging from opening 81 form a slurry in the second liquid in recess 79 and pass at a relatively high velocity through opening 80, thus ensuring that little turbulence occurs in recess 79. The new slurry is removed by slurry discharge pipe 19 is previously described with reference to FIG. 1. The space between the casing 18 and the central part of shaft 3 is kept full of slurry by back pressure applied at pipe 19.

An apparatus according to FIG. 3 in which disc 77 is of radius from the axis 80 mm, opening 81 is at a distance of 150 mm from the axis, and the width of the opening (which constitutes a continuous gap between the dished ends of tubes 73 and 74) is 12 mm was tested as follows.

Slurries of solids contents (by weight) shown in the table below were fed through tube 12 to inner chamber 72 and the inner and outer chambers 72 and 71 were rotated at the speeds shown. Slurry is deflected by disc 77 to position X where the gravitational force is quoted as G, this being the point at which the liquid passes to the withdrawal zone 83 of the inner chamber but solids pass to opening 81.

In each case the solid used was a plastic (PVC copolymer) in the form of spheres of mean diameter 120 microns, 70% by weight of the particles being in the range 120±30 microns diameter. The particle density of the spheres (that is the density of the material of which the spheres are made) was 1360 kg/m$^3$. The liquid component was water at a temperature of 60° C. (density 983 kg/m$^3$). A small quantity of an organic dye was present as a liquid marker.

Water at a temperature of approximately 10° C. (density 1000 kg/m$^3$) was fed to the outer chamber.

The feed rate of the original slurry was 4m$^3$/hr and the water feed rate was 15% greater than the water content of the slurry. The slurry withdrawal rate was set at 4m$^3$/hr; where virtually all of the solids were withdrawn in the new slurry the solids content of the new slurry was similar to that in the original slurry and 15/115ths of the water feed passed into the inner chamber and was recovered together with the original water/dye content of the first slurry.

"Solids recovery" is the percentage of the solids in the first slurry which are recovered in the new slurry.

The % of the liquid of the new slurry derived from the liquid of the first slurry is calculated from the dye content of the respective liquids assessed by spectrophotometry.

| Apparatus | Rotation (revolutions per minute) | Gravitational force G at point X, (m sec$^{-2}$) | Solids content of (original % slurry w/w) | Solids recovery % | % of new slurry liquid derived from first slurry |
|---|---|---|---|---|---|
| Basic (no packing) | 1850 | 3000 | 16 | 89 | 11 |
| Basic (with packing) | 2345 | 4830 | 17 | 98 | 8 |
| Basic (with packing) | 2345 | 4830 | 30 | 85 | 10 |
| Modified (with no packing) | 2345 | 4830 | 18 | 98 | 5 |
| Modified (with packing) | 2345 | 4830 | 11 | 99 | 2 |
| Modified (with packing) | 2345 | 4830 | 23 | 96 | 5 |

The first three results were obtained with a device in which walls 70 terminate at line Y identified as the "basic" apparatus, and the last three relate to the device as shown with extended walls 70 (the "modified" apparatus). The results show the benefit of this modification in terms of reduced carry through of feed liquid in the new slurry. The above results also show that the effect of the porous packing is to reduce the carry through of feed liquid into the new slurry.

It will be seen from the first and second results that an increase in rate of rotation is beneficial in terms of solids recovery. In general, a slurry of high solids content will suitably be treated at a higher rate of rotation than one of low solids content.

The packing was porous metal packing in the form of large pore rigid metallic foam sold under the trade mark "Retimet". It was rated at 20 cells per inch, the space occupied by metal being very little; thus the average diameter of the pores was nearly 0.05 inch.

For convenience of construction the dished ends of tubes 73 & 74 have central conical and outer flat profiles. It will be appreciated that for example a continuously curving profile can be used and may reduce discontinuities of flow where the profile changes. The profile may be such as to ensure that each element of constant radius of the inner chamber is of the same volume; thus the separation of the dished ends is proportionality less as greater radii.

The apparatus according to FIG. 3 was tested in a similar manner to that described above, but with ethylene glycol at 10° C. (density 1120 kg/m$^3$, viscosity 32.7 cP) rather than water at 10° C. (density 1000 kg/m$^3$, viscosity 1.3 cP) fed to the outer chamber.

Under otherwise identical conditions to the fourth result in the previous table the achieved solids recovery was identical at 98%, but the percentage of new slurry liquid derived from the first slurry was 20 to 25%. This result may be attributable to the higher viscosity of ethylene glycol compared with water.

We claim:

1. A process which comprises driving a solid component of a slurry comprising a first liquid and the solid through a barrier into a second liquid which is miscible with the first liquid and in which the density of the solid is greater than that of both liquids or in which the second liquid is of density intermediate between that of the solid and the first liquid by a substantially enhanced gravitational field by rotating the slurry in contact with a zone comprising the second liquid.

2. A process as claimed in claim 1 in which the second liquid is of density intermediate between that of the solid and the first liquid.

3. A process as claimed in claim 2 in which the slurry comprises 10 to 50% by volume of solid.

4. A process claimed in claim 2 in which the difference in density of the solid and first liquid is at least 10% and the second liquid is at least 1% different from both at the temperature of the process.

5. A process as claimed in claim 2 in which the first and second liquids are chemically identical but differ in temperature.

6. A process which comprises feeding and rotating a slurry comprising a first liquid and a solid in contact with one side of a rotating barrier which is permeable to solids of the slurry, contacting the other side of the said barrier with a second liquid of density intermediate between that of the solid and the first liquid and thereby driving the solids through the barrier by centrifugal forces and thereby forming a slurry of the solids in the second liquid.

7. A process as claimed in claim 6 in which the rates of flow of liquid are such as to ensure that the greater part of the liquid composition change occurs within or near the barrier.

8. A process as claimed in claim 7 in which the barrier comprises a permeable porous material.

9. A process which comprises,
(a) feeding a slurry comprising a first liquid and a solid component of higher density than the first liquid into a zone within a rotating barrier which is permeable to solids of the slurry,
(b) rotating the slurry within the said barrier,
(c) feeding a second liquid which is of greater density than the first, and which is of density less than the solid to a zone in which it rotates at substantially the same angular velocity as the slurry and contacts an outer surface of the said barrier and driving the solids through the barrier from the first to the second zone by centrifugal forces.

* * * * *